US008651685B2

(12) United States Patent
Roberts et al.

(10) Patent No.: US 8,651,685 B2
(45) Date of Patent: Feb. 18, 2014

(54) APPARATUS AND METHODS FOR BACKLIGHT UNIT WITH VERTICAL INTERIOR REFLECTORS

(75) Inventors: John K. Roberts, Grand Rapids, MI (US); Chenhua You, Cary, NC (US)

(73) Assignee: Cree, Inc., Durham, NC (US)

( * ) Notice: Subject to any disclaimer, the term of this patent is extended or adjusted under 35 U.S.C. 154(b) by 160 days.

(21) Appl. No.: 11/687,165

(22) Filed: Mar. 16, 2007

(65) Prior Publication Data
US 2008/0225512 A1 Sep. 18, 2008

(51) Int. Cl.
G09F 13/08 (2006.01)
F21V 13/04 (2006.01)
F21V 7/05 (2006.01)

(52) U.S. Cl.
USPC .......... 362/97.3; 362/240; 362/246; 362/247; 362/299

(58) Field of Classification Search
USPC .......... 362/97, 241, 246, 247, 299, 300, 307, 362/308, 555, 558, 97.1–97.4, 240
See application file for complete search history.

(56) References Cited

U.S. PATENT DOCUMENTS

| | | | |
|---|---|---|---|
| 6,491,412 B1 * | 12/2002 | Bowman et al. | 362/241 |
| 6,536,914 B2 * | 3/2003 | Hoelen et al. | 362/231 |
| 6,578,990 B2 * | 6/2003 | Hildenbrand et al. | 362/341 |
| 7,072,096 B2 * | 7/2006 | Holman et al. | 359/298 |
| 7,314,292 B2 * | 1/2008 | Marra et al. | 362/307 |
| 7,434,977 B2 * | 10/2008 | Fukasawa et al. | 362/631 |
| 7,481,553 B2 * | 1/2009 | Kim et al. | 362/240 |
| 7,497,587 B2 * | 3/2009 | Klose | 362/147 |
| 7,530,711 B2 * | 5/2009 | Bang | 362/241 |
| 7,566,146 B2 * | 7/2009 | Jeon | 362/247 |
| 7,671,832 B2 * | 3/2010 | Lankhorst et al. | 345/102 |
| 7,997,771 B2 * | 8/2011 | Epstein et al. | 362/339 |
| 2006/0164858 A1 | 7/2006 | Park et al. | |
| 2006/0221612 A1 * | 10/2006 | Song et al. | 362/247 |
| 2006/0245208 A1 | 11/2006 | Sakamoto et al. | |
| 2006/0279671 A1 | 12/2006 | Han et al. | |
| 2006/0285326 A1 | 12/2006 | Jeon | |
| 2007/0070625 A1 * | 3/2007 | Bang | 362/240 |

FOREIGN PATENT DOCUMENTS

| | | |
|---|---|---|
| EP | 1 722 267 A1 | 11/2006 |
| JP | 06-250178 A | 9/1994 |
| JP | 2006-190847 A | 7/2006 |
| JP | 2006190847 A | 7/2006 |
| JP | 2006-202725 A | 8/2006 |

(Continued)

OTHER PUBLICATIONS

International Search Report and Written Opinion for International Application No. PCT/US2008/003008, Mailed Aug. 5, 2008 (16 pages).

(Continued)

Primary Examiner — Alan Cariaso
(74) Attorney, Agent, or Firm — Myers Bigel Sibley & Sajovec, P.A.

(57) ABSTRACT

Provided are solid state backlight devices and methods for forming the same. A solid state backlight unit according to some embodiments of the invention includes a housing having a major surface and multiple LEDs on a first surface of the major surface. The solid state backlight unit also includes a specular reflector proximate to the first surface of the major surface and oriented substantially perpendicular to the first surface of the major surface.

22 Claims, 5 Drawing Sheets

(56) References Cited

FOREIGN PATENT DOCUMENTS

| | | | |
|---|---|---|---|
| JP | 2006-202753 A | 8/2006 |
| JP | 2006-332024 A | 12/2006 |
| JP | 2006-338020 A | 12/2006 |
| JP | 2006-351540 A | 12/2006 |
| JP | 2007 066634 A | 3/2007 |
| TW | 1240788 B | 10/2005 |
| TW | M305912 | 2/2007 |
| WO | WO 2006/125174 A2 | 11/2006 |
| WO | WO 2006/126802 A1 | 11/2006 |
| WO | WO 2007/027434 A1 | 3/2007 |
| WO | WO 2008/007347 A2 | 1/2008 |

OTHER PUBLICATIONS

Communication pursuant to Article 94(3) EPC corresponding to European Application No. 08 726 525.2 dated May 13, 2011; 7 pages.

First Office Action dated Dec. 3, 2010 corresponding to Chinese Patent Application No. 200880016367,5; 10 pages.

European Search Report corresponding to European Patent Application No. 08 726 525; Dated: Nov. 15, 2010.

Second Office Action dated Aug. 8, 2011 corresponding to Chinese Patent Application No. 200880016367.5; 9 pages.

Decision on Rejection dated Jun. 6, 2012 corresponding to Chinese Patent Application No. 200880016367.5; (Translation Only); 9 pages.

Communication pursuant to Article 94(3) EPC corresponding Application No. 08 726 525.2-2205; Dated Aug. 3, 2012; 5 pages.

European Office Action Corresponding to European Application No. 11 194 308; Dated: Oct. 25, 2012; 6 Pages.

Translation of Taiwan Office Action Corresponding to Taiwan Application No. 097108900; Dated: Sep. 24, 2013; 7 Pages.

\* cited by examiner

APPARATUS AND METHODS FOR BACKLIGHT UNIT WITH VERTICAL INTERIOR REFLECTORS

FIELD OF THE INVENTION

The present invention relates to solid state lighting, and more particularly to backlight unit reflectors.

BACKGROUND

Solid state lighting panels may be used as solid state backlight units for displays, as lighting panels for general illumination, as backlights for signage, and/or for other purposes. Solid state backlighting units for LCD displays typically include a two dimensional array of discrete light sources arranged behind an LCD screen. The discrete light sources may generate light having a white or near-white color that may be used to illuminate an LCD display, such as a full-color LCD display. In order for the LCD display to display an image on the screen having uniform color and/or intensity, it may be desirable for the backlight unit to provide a light to the LCD screen that is spatially uniform, both in color and intensity. This may be difficult, however, as the discrete light sources may be spaced apart from each other in the backlight unit.

SUMMARY

Methods of forming a solid state backlight unit according to some embodiments of the invention include mounting LEDs to a first surface. The methods can further include attaching a first vertical reflector, wherein the first vertical reflector is configured to extend from the first surface, wherein the first vertical reflector is oriented substantially perpendicular to the first surface, and wherein the first vertical reflector is positioned adjacent a first side of the LEDs.

Methods may further include attaching a second vertical reflector that can extend from the first surface, and can be oriented substantially perpendicular to the first surface. The vertical reflector can also be positioned adjacent a second side of the LEDs.

Attaching the first vertical reflector may include providing a housing first sidewall configured to extend from a first edge of the major surface substantially perpendicularly to the major surface and attaching a specularly reflective component to a first sidewall surface, wherein the first sidewall surface has a normal vector that is directed towards the plurality of LEDs. In some embodiments, the specularly reflective component can be a metallic tape. In other embodiments, a specularly reflective component can include an optical film.

Some embodiments may also include engaging the first surface with a diffuse reflector. In some embodiments, the diffuse reflector may be a coating on the first surface.

A solid state backlight unit according to some embodiments of the invention includes a housing that includes a major surface having a surface on which multiple LEDs are mounted. The solid state backlight unit may also include a specular reflector proximate to the surface of the major surface such that the specular reflector is oriented substantially non-parallel to the first surface of the major surface.

The solid state backlight unit may also include a diffuse reflector on the major surface. The diffuse reflector can include multiple of apertures configured to receive the LEDs.

Yet other embodiments of the solid state backlight unit can include a first specular reflector having a first reflective surface, wherein the first specular reflector is positioned adjacent a first side of the LEDs and a second specular reflector having a second reflective surface, wherein the second specular reflector is positioned adjacent a second side of the LEDs. In some embodiments, the first reflective surface has a normal vector that intersects with and is perpendicular to the second reflective surface.

In further embodiments, the housing can include a first sidewall and a second sidewall. In some embodiments, the first and second sidewalls extend from and are substantially parallel to the first surface and the first surface and the first and second sidewalls define an optical cavity.

In some embodiments, the specular reflector may include an aluminum tape and/or a multilayer optical film.

The solid state backlight unit may further include a means for diffusing light transmitted from an optical cavity that is defined by the first surface, a first sidewall, and a second sidewall.

A solid state backlight unit according to some embodiments can also include a diffuser that is positioned substantially parallel to the first surface, wherein the diffuser transmits light from the plurality of LEDs and the specular reflector.

A display according to some embodiments of the invention includes a solid state backlight unit according to embodiments disclosed herein.

A solid state backlight unit according to some embodiments of the invention includes at least one emitter configured to radiate light, a diffuse reflector that is configured to reflect a first portion of the light radiated from the at least one emitter and a first vertical reflector that is configured to reflect a second portion of the light radiated from the at least one emitter. The solid state backlight unit further includes a second vertical reflector that is configured to reflect a third portion of the light radiated from the at least one emitter and a diffuser, configured to transmit the light radiated from the at least one emitter, the reflected first portion, the reflected second portion and the reflected third portion.

In other embodiments, the first and second vertical reflectors are substantially perpendicular to the diffuse reflector and wherein the first vertical reflector is substantially parallel to the second vertical reflector.

In yet other embodiments, the first and second vertical reflectors comprise a multilayer optical film and/or a metallic tape.

In further embodiments, the diffuser can be substantially parallel to the diffuse reflector.

In yet further embodiments, the first vertical reflector can be configured to reflect light to the second vertical reflector and the second vertical reflector can be configured to reflect light to the first vertical reflector.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Figure 1:
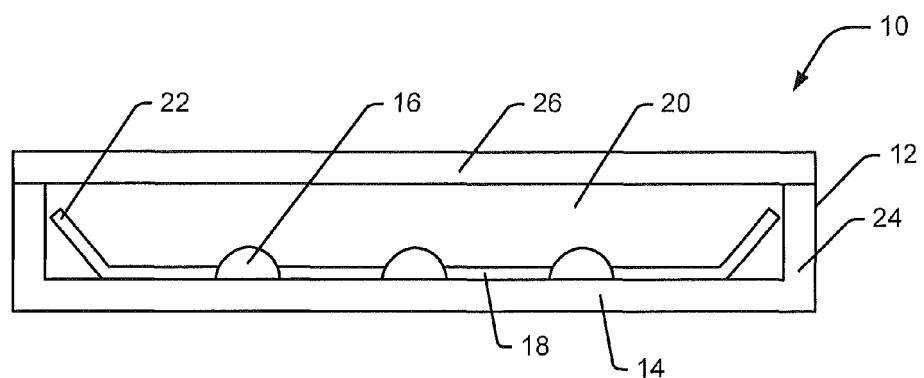
FIG. 1 is a side cross-sectional view of a solid state backlight unit.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

For example, referring to FIG. 1, a solid state BLU 10 can include a housing 12 that includes a major surface 14 and sidewalls 24. A diffuser 26 can be mounted on the sidewalls 24 of the housing 12 and, in combination with the housing 12, defines an optical cavity 20. A plurality of LEDs 16 can be mounted within the optical cavity 20 to a first surface of the major surface 14. A diffuse reflector 18 can also be mounted to the major surface 14 such that the diffuse reflector 18 can include apertures that are configured to receive the LEDs 16. The diffuse reflector 18 also includes angled sidewalls 22 that are configured to reflect light at the edges of the BLU 10 and intended to improve the uniformity of light emitted by the BLU 10. The angled sidewalls 22 may include a specularly reflective portion configured to reflect received light toward the diffuser 26 to increase the uniformity of the light transmitted from the solid state BLU 10.

Figure 2:
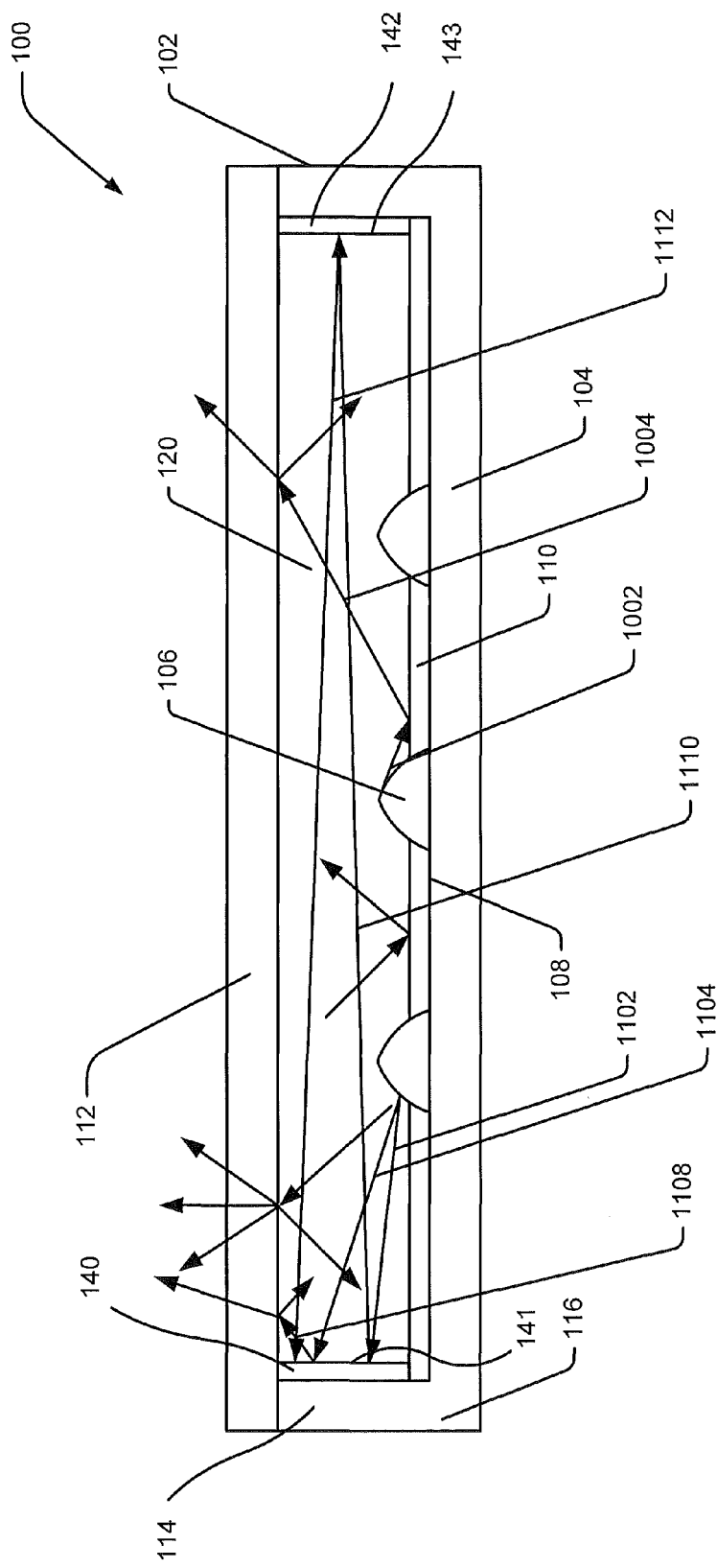
FIG. 2 is a side cross-sectional view of a solid state backlight unit in accordance with some embodiments of the invention.

Reference is now made to FIG. 2, which is a side cross-sectional view of a solid state backlight unit according to some embodiments of the invention. A backlight unit (BLU) 100 can include a housing 102 that includes a major surface 104 and sidewalls 114. The sidewalls 114 can be configured to extend up from edges 116 of the major surface 104. The major surface 104 can include a first surface 108, on which a plurality of LEDs 106 can be mounted. In some embodiments, LEDs 106 may be mounted as disclosed in the commonly assigned U.S. patent application filed on Nov. 17, 2006 and having the title SOLID STATE LIGHTING UNITS AND METHODS OF FORMING SOLID STATE LIGHTING UNITS, which is hereby incorporated by reference in its entirety.

A diffuse reflector 110 can be mounted on the first surface 108 and can include a plurality of apertures configured to receive the plurality of LEDs 106 and/or permit light to pass therethrough. A diffuser 112 can be mounted on the housing sidewalls 114 and, in combination with the major surface 104 and the sidewalls 114, can create an optical cavity 120. The diffuser 112 can be used to diffuse light emitted by the LEDs 106 and/or reflected by reflective surfaces within the optical cavity 120. The diffuse reflector 110 is arranged to reflect a portion of light 1002 radiated from at least one LED 106. The diffuse 112 is arranged to partially transmit light reflected 1004 from the diffuse reflector 110 and light directly radiated from al least one LED 106. In addition to transmitting a portion of the received light, the diffuser 112 may also be configured to reflect a portion of the received light back into the optical cavity for further reflection by other reflective surfaces in the optical cavity. By recycling a portion of the light received at the diffuser 112, the light that is transmitted by the diffuser may have improved uniformity.

The BLU 100 can also include a vertical reflector 140 having a generally specularly reflective surface 141. In contrast with diffuse reflection, which reflects the photons in a pattern that is distinct from that of a light source, a specular reflection reflects photons in the same general pattern as that of the light source. In this manner, a reflector reflects an image such as a mirror image of the light source. The vertical reflector 140 can include a metallic film, tape and/or strip. The vertical reflector 140 can also use an optical film including, but not limited to, the Vikuiti™ product, which is an Enhanced Specular Reflector (ESR) that is commercially available from the 3M™ Corporation. The BLU can also include another vertical reflector 142 that includes a reflective surface 143. In some embodiments, the reflective surfaces 141, 143 can include specularly reflective portions and/or diffusely reflective portions. In use and operation, the vertical reflectors 140, 142 receive light from the LEDs 106 and reflect LED images. The LED images that are reflected from the first vertical reflector 140 can be received, in part, by the second vertical reflector 142. In this regard, the first vertical reflector 140 reflects light 1102, 1104 received from at least one LED 106. Although not expressly illustrated, the second vertical reflector 142 may receive in the same manner as the first vertical reflector 140 from at least one LED 106. Similarly, LED images that are reflected from the second vertical reflector 142 can be received, in part, by the first vertical reflector 140, such that an "infinite mirror" optical effect is created by the oppositely facing vertical reflectors 140, 142. For example, the first vertical reflector 140 may reflect light 1110 to the second vertical reflector 142 and the second vertical reflector 142 may reflect light 1112 to the first reflector. In this manner, light can be delivered to the diffuser 112 from multiple directions, including from LED images that are beyond the edges of the BLU 100 and reflected from one or more of the vertical reflectors 140 and 142, (1108), from the diffuse reflector 110 (1004) in addition to light delivered directly from the plurality of LEDs 106. In some embodiments, the vertical reflectors 140, 142 may each be substantially vertical within a range of approximately 15 degrees of angular deviation from vertical.

Figure 3:
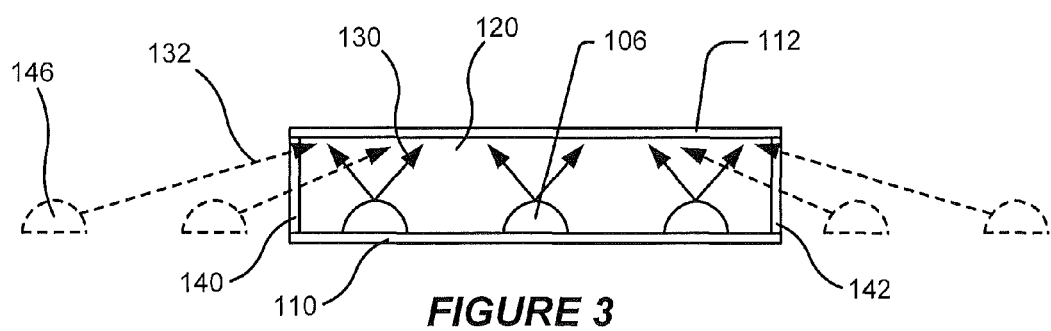
FIG. 3 is a partial, side cross-sectional view of a solid state backlight unit illustrating specularly reflected light in accordance with some embodiments of the invention.

Reference is now made to FIG. 3, which is a partial, side cross-sectional view of a solid state backlight unit illustrating specularly reflected light in accordance with some embodiments of the invention. An optical cavity 120 can be defined by a diffuse reflector 110, a diffuser 112, and vertical reflectors 140, 142. The vertical reflectors 140, 142 reflect LED images 146 from a plurality of LEDs 106. In addition to primary light 130 from the LEDs 106, the diffuser 112 can receive reflected light 132 from the LED images 146. In this manner, the light received and transmitted by the diffuser 112 can be more uniform at the edges of the diffuser 112 as a result from the reflected light 132 that is received from LED images 146 that are outside the optical cavity 120.

Figure 4:
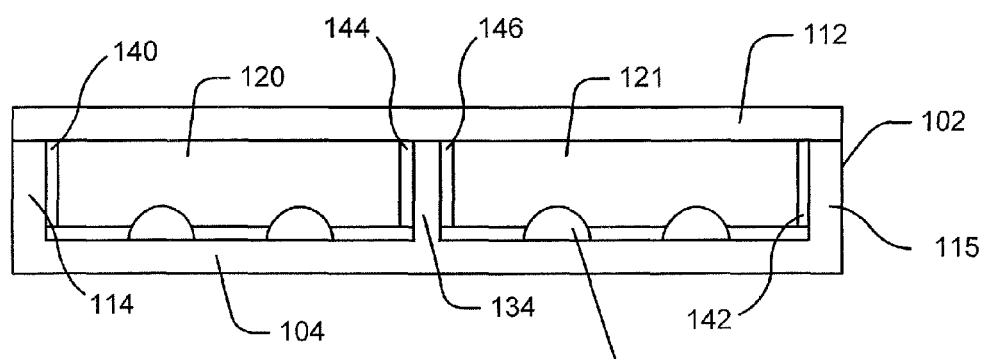
FIG. 4 is a side cross-sectional view of a solid state backlight unit in accordance with further embodiments of the invention.

Reference is now made to FIG. 4, which is a side cross-sectional view of a solid state backlight unit in accordance with further embodiments of the invention. A BLU housing 102 of some embodiments can include sidewalls 114, 115 and a center wall 134. A center wall 134 might be included to provide additional structural integrity to a BLU. A diffuser 112 can be mounted on the sidewalls 114, 115 and the center wall 134 such that two optical cavities 120, 121 can be defined. Vertical reflectors 144, 146 are mounted to the center wall 134 such that each of the optical cavities 120, 121 generates the "infinite mirror" optical effect between the sidewall vertical reflectors 140, 142 and the respective center wall vertical reflectors 144, 146. In this manner, where an additional housing structure, such as a center wall 134 is used, uniformity of light emitted may not be adversely impacted by a shadow or other reduction in brightness that might otherwise occur due to the additional housing structure.

Figure 5:
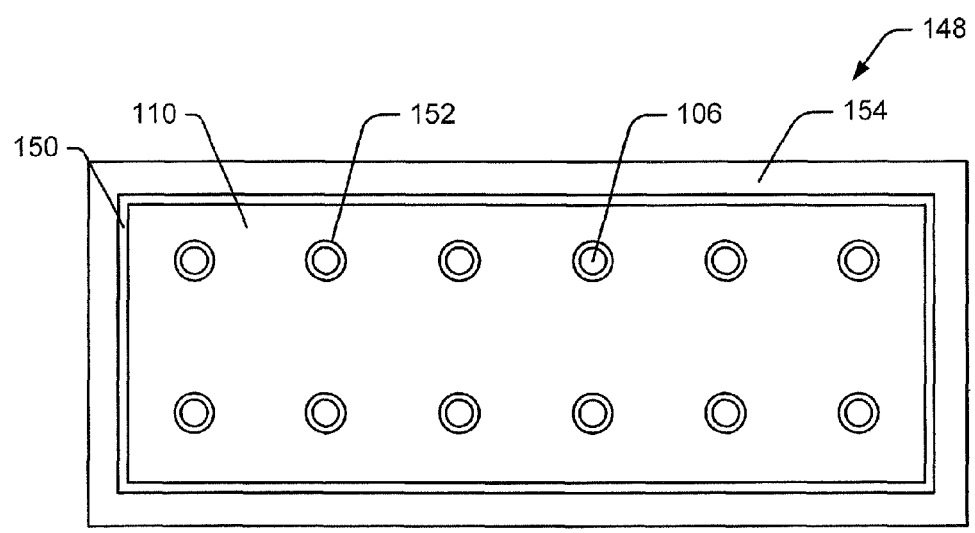
FIG. 5 is a partial, top cross-sectional view of a solid state backlight unit in accordance with some embodiments of the invention.

Reference is now made to FIG. 5, which is a partial, top cross-sectional view of a solid state backlight unit in accordance with some embodiments of the invention. The BLU 148 includes a housing with a sidewall 154 having a generally rectilinear geometry. The BLU 148 includes a diffuse reflector 110 having apertures 152 configured to receive LEDs 106 and/or permit light to pass therethrough. A vertical reflector 150 is mounted to the housing sidewall 154. The surfaces of vertical reflector 150 reflect the light from the LEDs 106 and from the other surfaces of the vertical reflector 150. In this manner, the light transmitted through the diffuser (not shown in this view) near the housing sidewall 154 can remain relatively uniform due to the LED images that are located outside the perimeter of the sidewall 154 by virtue of the vertical reflector 150.

Figure 6:
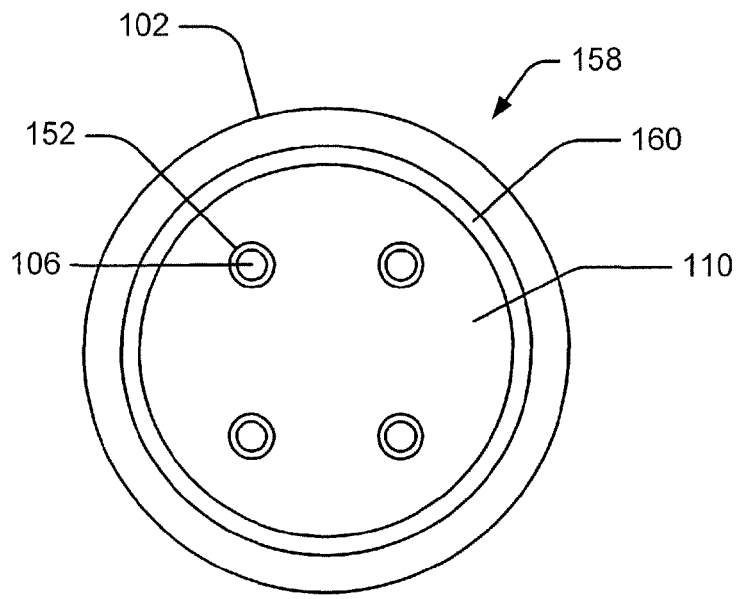
FIG. 6 is a partial, top cross-sectional view of a solid state backlight unit in accordance with further embodiments of the invention.

Similarly, reference is now made to FIG. 6, which is a partial, top cross-sectional view of a solid state backlight unit in accordance with further embodiments of the invention. The BLU 158 includes a housing with a sidewall 164 having a generally circular geometry. The BLU 158 can include a diffuse reflector 110 having apertures 152 that can receive LEDs 106. A vertical reflector 160 configured in a generally circular geometry can be mounted to the housing sidewall 164. Although embodiments are illustrated as generally circular, the geometry of the BLU can include various configurations including, for example, elliptical, polygonal, or some combination thereof.

Figure 7:
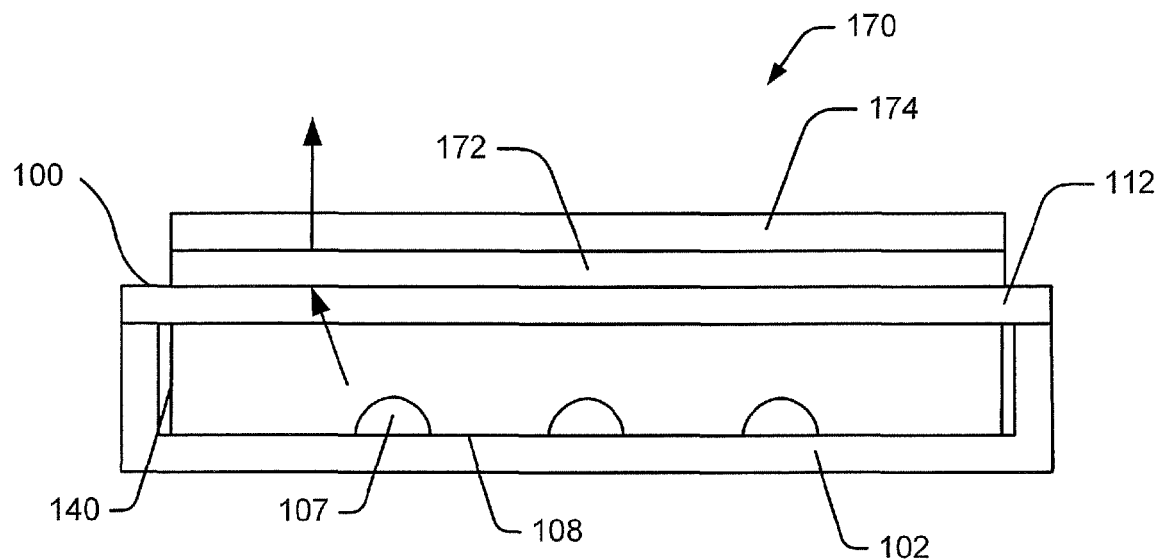
FIG. 7 is a side cross-sectional view of a display having a solid state backlight unit in accordance with embodiments of the invention.

Reference is now made to FIG. 7, which is a side cross-sectional view of a display having a solid state backlight unit in accordance with embodiments of the invention. The display 170 can include a solid state backlight unit 100, which may include a housing 102 having a first surface 108. Multiple solid state light emitters 107 may be mounted to the first surface 108 and substantially vertical reflectors 140 may be arranged to define, in combination with the first surface 108, an optical cavity. A diffuser 112 can be arranged to diffuse light originating from the solid state light emitters 107 and reflected from the vertical reflectors 140 and to transmit a portion thereof towards a collimator 172. The collimator 172 may be configured to collimate received light and transmit the collimated light towards a display panel 174. The display panel 174 may be configured to selectively transmit light corresponding to pixels on the display panel 174 in order to create a display image. The display panel 174 may also use color filtering at the pixel level to provide different colors of pixels.

Figure 8:
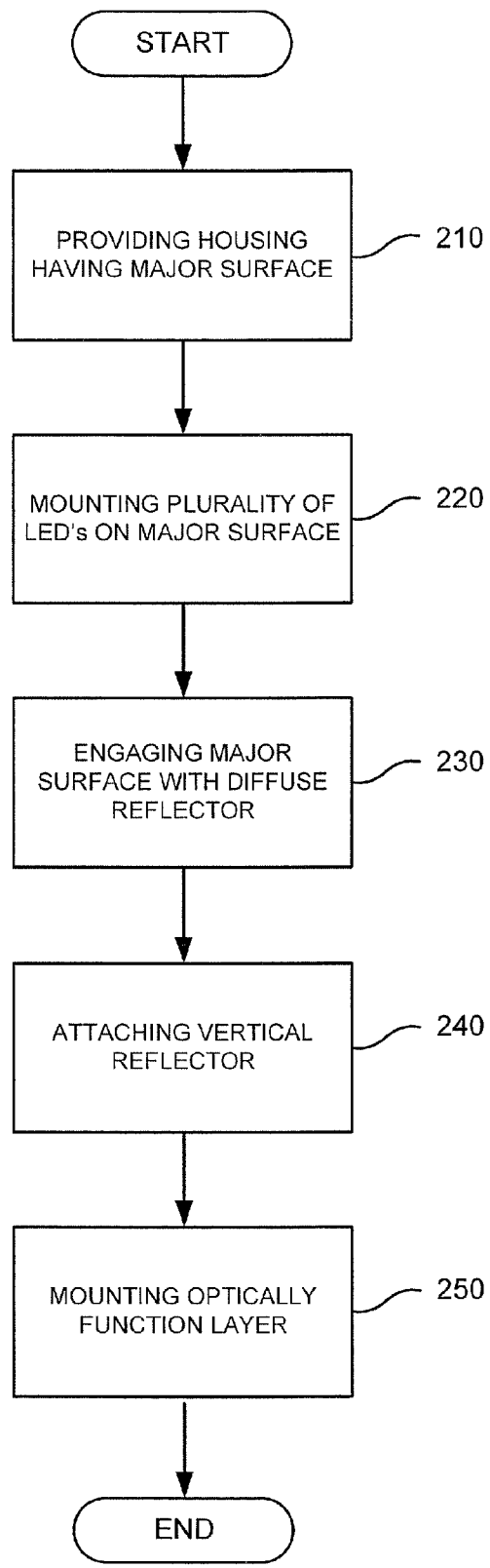
FIG. 8 is a block diagram illustrating methods of forming a solid state backlight unit according to some embodiments of the invention.

Reference is now made to FIG. 8, which is a block diagram illustrating methods of forming a solid state backlight unit according to some embodiments of the invention. A backlight unit housing having a major surface is provided (block 210). The housing can further include sidewalls that extend generally perpendicularly from one or more edges of the major surface. In some embodiments, interior walls can extend perpendicularly from the major surface in areas not adjacent the edges of the major surface.

Multiple LEDs are mounted on the major surface (block 220). The LEDs can be mounted on one surface of the major surface to create a planar arrangement of light sources. In some embodiments, the BLU can be formed using a single LED. The major surface can also engage a diffuse reflector (block 230). The diffuse reflector can be substantially planar and can include one or more apertures that can be configured to receive the LEDs and/or permit light to pass therethrough. The diffuse reflector may be a sheet, plate and/or coating on the first surface. The diffuse reflector may include materials that include diffuse reflective properties.

A vertical reflector can be attached to the housing such that the vertical reflector is substantially non-parallel to the major surface (block 240). Some embodiments may utilize a non-vertical reflector attached to the housing. The vertical reflector can include a metallic tape, film, and/or strip. In some embodiments, the vertical reflector can include an optical film such as, for example, a multilayer ESR. The vertical reflector can be configured to reflect light received from the LEDs, other portions of the vertical reflector, and the diffuse reflector. In some embodiments, the vertical reflector is diffuse and/or specular. Where portions of the vertical reflector are positioned parallel and facing each other, an "infinite mirror" optical effect can be achieved, which can result in an infinite array of LED images.

An optically functional layer can be mounted to a distal edge of housing sidewalls (block 250). The optically function layer may be a modifying layer such that light transmitted therethrough is modified from an entering form to a different exiting form. In some embodiments, the optically functional layer may be a diffuser, which may be, for example, a sheet or plate. In some embodiments, the optically functional layer may be a polarizer, a brightness enhancement filter, a light recycling layer, an optical filter, a spectral filter, collimator, and/or holographic diffuser configured to promote light recycling, uniformity, and/or other desirable characteristics of the light. In some embodiments, layers can include multiple sheets and/or plates of a variety of optically functional and/or non-functional materials. The optically functional layer, the major surface, and housing sidewalls can define an optical cavity. Light that is transmitted and/or reflected within the optical cavity can be transmitted through the diffuser. Use of the vertical reflectors at the edges of the housing can improve uniformity of the light transmitted through the surface of the optically functional layer by generating LED images that are located outside the optical cavity.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A solid state backlight unit, comprising:
   a first solid state emitter and a second solid state emitter that are configured to radiate light;
   a diffuse reflector arranged to reflect first portions of the light radiated from the first and second solid state emitters
   a diffuser arranged to partially transmit the light directly radiated from the first and second solid state emitters and the reflected first portions;
   a center wall that is positioned between the first emitter and the second emitter; and
   a first vertical reflector arranged to reflect a second portion of the light directly radiated from the at least one emitter
   wherein the first vertical reflector comprises a substantially specularly reflective surface.

2. The solid state backlight unit of claim 1, wherein the diffuser is substantially parallel to the diffuse reflector.

3. The solid state backlight unit of claim 1,
   wherein the diffuser is arranged to partially transmit the reflected second portion.

4. The solid state backlight unit of claim 3, further comprising:
   a second vertical reflector arranged to reflect a third portion of the light directly radiated from the at least one emitter,
   wherein the diffuser is arranged to partially transmit the reflected third portion.

5. The solid state backlight unit of claim 4, wherein the first and second vertical reflectors are substantially perpendicular to the diffuse reflector and wherein the first vertical reflector is substantially parallel to the second vertical reflector.

6. The solid state backlight unit of claim 4, wherein the first and second vertical reflectors comprise a multilayer optical film.

7. The solid state backlight unit of claim 4, wherein the first and second vertical reflectors comprise a metallic tape.

8. The solid state backlight unit of claim 4, wherein the first vertical reflector is configured to reflect light to the second vertical reflector and wherein the second vertical reflector is configured to reflect light to the first vertical reflector.

9. A solid state backlight unit, comprising:
   at least one solid state emitter configured to radiate light;
   a diffuse reflector configured to reflect a first portion of the light directly radiated from the at least one emitter and that includes at least one aperture that is configured to receive the at least one solid state emitter;
   a first vertical reflector including a substantially specularly reflective surface configured to reflect a second portion of the light radiated from the at least one emitter;
   a second vertical reflector configured to reflect a third portion of the light radiated from the at least one emitter; and
   a diffuser that is configured to be substantially parallel to a display panel and that is configured to partially transmit the light radiated from the at least one emitter, the reflected first portion, the reflected second portion and the reflected third portion to the display panel.

10. A solid state backlight unit, comprising:
a first solid state emitter and a second solid state emitter that are configured to radiate light;
a diffuse reflector arranged to reflect a first portion of the light radiated from the first and second solid state emitters;
a first vertical reflector arranged to reflect a second portion of the light directly radiated from the first solid state emitter; and
a second vertical reflector that is positioned between a first optical cavity that includes the first solid state emitter and a second optical cavity that includes the second solid state emitter,
wherein the first vertical reflector comprises a substantially specularly reflective surface.

11. The solid state backlight unit of claim 10, further comprising a diffuser arranged to partially transmit the light directly radiated from the at least one emitter, the reflected first portion, the reflected second portion and the reflected third portion.

12. The solid state backlight unit of claim 11, wherein the first and second vertical reflectors are substantially perpendicular to the diffuse reflector and wherein the first vertical reflector is substantially parallel to the second vertical reflector.

13. The solid state backlight unit of claim 11, wherein the diffuser is substantially parallel to the diffuse reflector.

14. The solid state backlight unit of claim 10, wherein the first and second vertical reflectors comprise a multilayer optical film.

15. The solid state backlight unit of claim 10, wherein the first and second vertical reflectors comprise a metallic tape.

16. The solid state backlight unit of claim 10, wherein the first vertical reflector is configured to reflect light to the second vertical reflector and wherein the second vertical reflector is configured to reflect light to the first vertical reflector.

17. A lighting panel, comprising:
a plurality of solid state emitters on a first surface;
a first vertical reflector that extends from the first surface, wherein the first vertical reflector is oriented substantially perpendicular to the first surface, and wherein the first vertical reflector is positioned adjacent a first side of the plurality of solid state emitters;
a second vertical reflector that extends from the first surface, wherein the second vertical reflector is positioned between a first emitter of the plurality of solid state emitters and a second emitter of the plurality of solid state emitters; and
a diffuse reflector arranged to reflect a portion of the light radiated from the first emitter,
wherein the first vertical reflector comprises a substantially specularly reflective surface.

18. The lighting panel of claim 17, wherein the second vertical reflector includes a first reflective surface on a first side of the second vertical reflector and a second reflective surface on a second side of the second vertical reflector that is opposite the first side.

19. The lighting panel of claim 17,
wherein the first vertical reflector is configured to reflect a first portion of light radiated from the first emitter;
wherein the second vertical reflector comprises a substantially specularly reflective first surface that is configured to reflect a second portion of light radiated from the first emitter and a substantially specularly reflective second surface that is configured to reflect a first portion of light radiated from the second emitter.

20. The lighting panel of claim 19, wherein at least one of the substantially specularly reflective surface of the first vertical reflector, the substantially specularly reflective first surface of the second vertical reflector and the substantially specularly reflective second surface of the second vertical reflector includes a specularly reflective component.

21. The lighting panel of claim 17, further comprising a third vertical reflector that extends from the first surface, wherein the third vertical reflector is oriented substantially perpendicular to the first surface, and wherein the third vertical reflector is positioned adjacent a second side of the plurality of solid state emitters that is opposite the first side of the plurality of solid state emitters.

22. The lighting panel of claim 17, further comprising:
a diffuser arranged to partially transmit the light directly radiated from the first emitter and the reflected portion from the diffuse reflector.

* * * * *